Sept. 6, 1960 K. HUDSON ET AL 2,951,985
APPARATUS FOR MONITORING A RECURRING PULSE GROUP
Filed Sept. 28, 1954 3 Sheets-Sheet 1

INVENTORS
KENNETH HUDSON
ROBERT P NELSON
BY
ATTORNEY

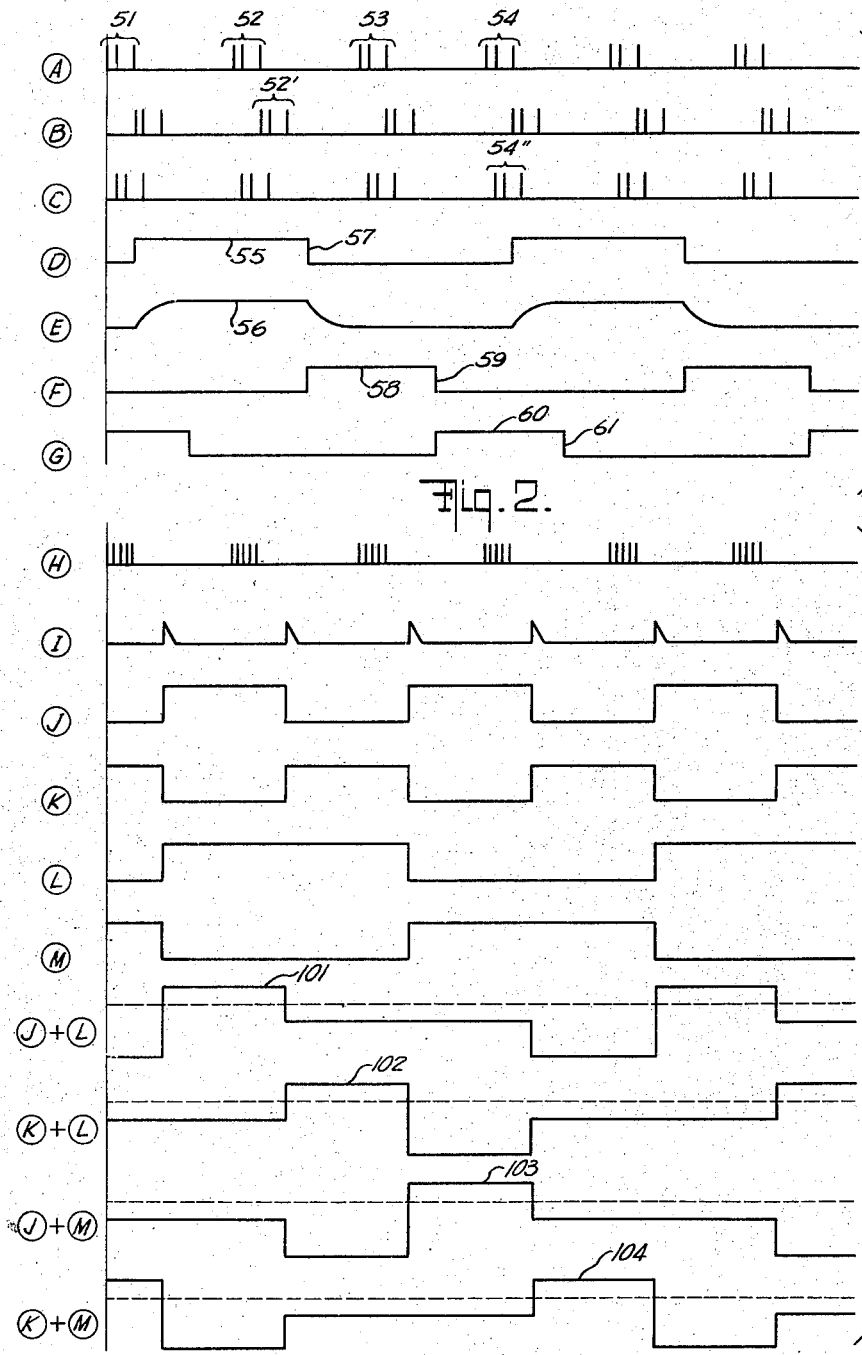

United States Patent Office 2,951,985
Patented Sept. 6, 1960

2,951,985
APPARATUS FOR MONITORING A RECURRING PULSE GROUP

Kenneth Hudson, Plainview, and Robert P. Nelson, Wantagh, N.Y., assignors to Sperry Rand Corporation, a corporation of Delaware Filed Sept. 28, 1954, Ser. No. 458,954

14 Claims. (Cl. 324—68)

This invention relates generally to a monitoring system and more particularly to such a system for observing the positional accuracy of a recurring group of coded pulses.

In communication systems using a recurring group of coded pulses, it may be desirable to observe the pulses in such a way as to accurately indicate with a high degree of precision deviation of each pulse in the group from its designated position with respect to the other pulses and the constancy with which each pulse in the group maintains its position from group to group.

This invention provides a means, including the interposing of various delays, for superimposing the various pulses, one from each of a succession of groups, so that the various deviations can be observed.

An object of this invention is to provide a system for observing the positional accuracy of the pulses in a recurring coded group of pulses.

Another object of this invention is to provide a means for superimposing a different pulse from each of a succession of recurring groups of pulses.

Figure 1:
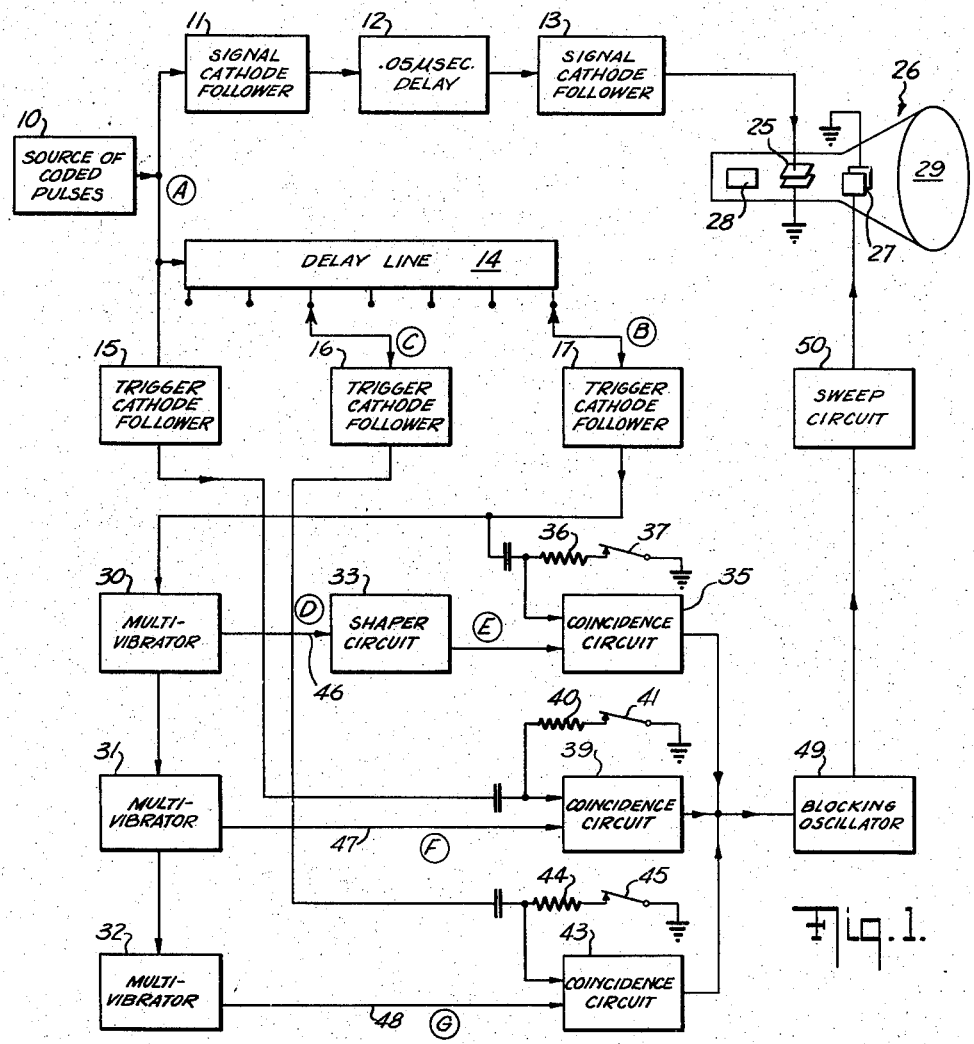
Figure 6:
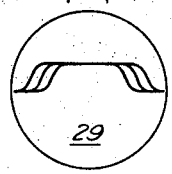
Figure 7:
Figure 8:
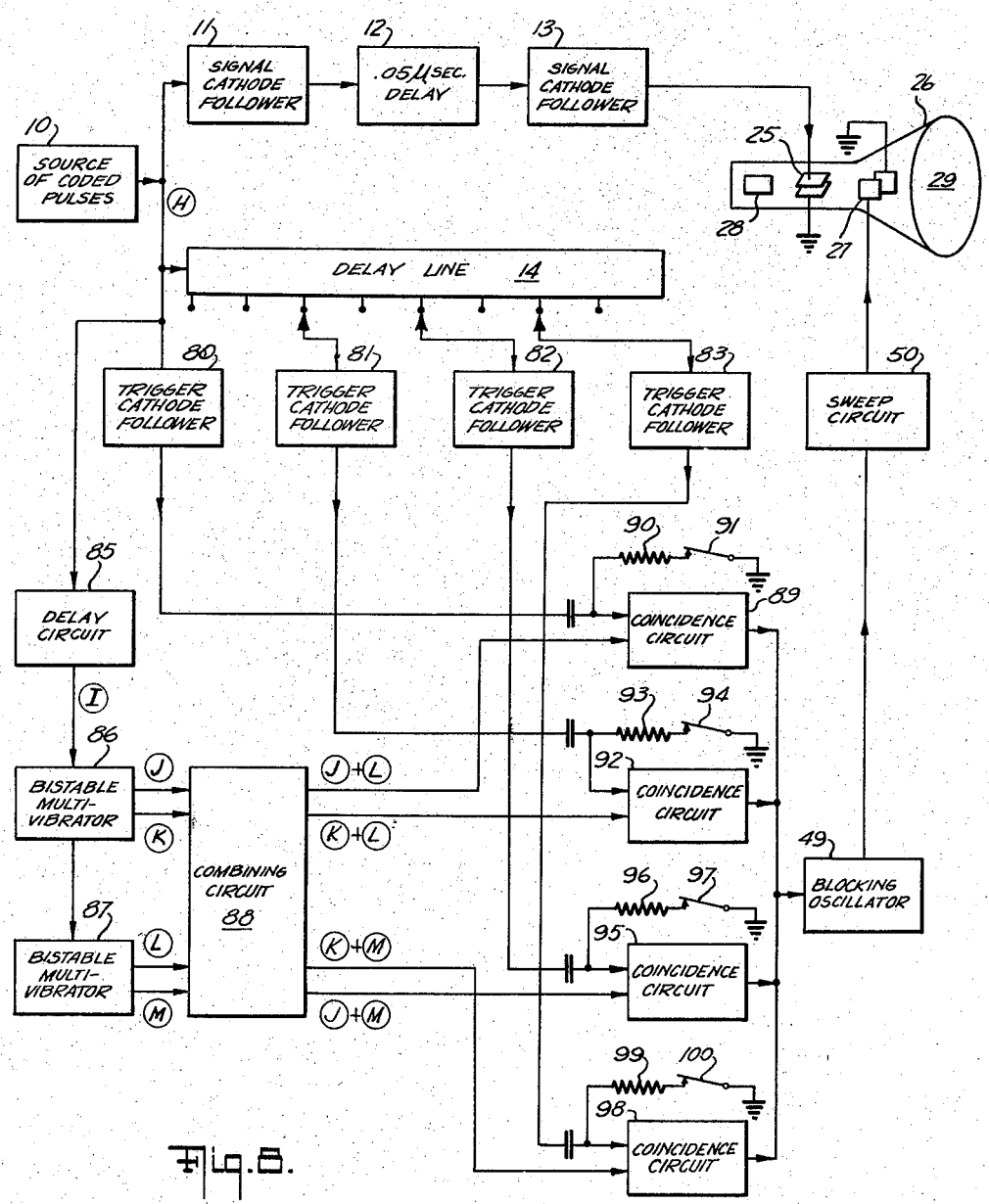

Other objects and advantages will occur to those skilled in the art after consideration of the following specification taken in connection with the accompanying drawings in which, Fig. 1 is a block diagram of a monitoring system embodying the principles of this invention, Fig. 2 is a series of curves useful in explaining the operation of the device of Fig. 1, Figs. 3 to 7 show various traces that may appear on the oscilloscope screen in the practice of this invention, Fig. 8 is a block diagram of an alternate embodiment of this invention, and Fig. 9 shows a series of curves useful in explaining the operation of the device of Fig. 8.

In the system shown in Fig. 1 there is provided a source 10 of coded pulses. The groups of pulses provided by the source 10 occur at a rate which is usually periodic. However, the system of this invention will operate successfully with groups occurring at a rate which is not entirely periodic. Each group may have any number of pulses. Different numbers of pulses may be observed by adding additional multivibrators and coincidence circuits and by increasing the total number of groups in a monitoring cycle. The pulses in each group may be relatively positioned in any manner to provide a recurring group of coded pulses.

For the purposes of the example used with respect to Fig. 1, it will be assumed that each group of coded pulses consists of three pulses, the second pulse being delayed behind the first pulse by 2 microseconds and the third pulse being delayed 6 microseconds behind the first pulse.

The output of the source 10 is connected to the inputs of the signal cathode follower stage 11 which is in turn connected to a delay circuit 12. The output of delay circuit 12 is connected through signal cathode follower stage 13 to one of the vertical deflection plates 25 of cathode ray tube 26. Cathode ray tube 26 also has horizontal deflection plates 27, an electron gun 28, and a screen 29.

The output of source 10 is also connected to the input of delay line 14 and to the input of trigger cathode follower stage 15. Delay line 14 has the property of delaying the signal applied at its input and has a series of taps along its length so that a plurality of selected delays may be obtained. For the purpose of this specification it will be assumed that the total delay of line 14 is 6 microseconds. It will be understood that one or more selectively operable switches may be used to determine the delays obtained from delay line 14.

There are also provided trigger cathode follower stages 16 and 17. The input of each of which is connected to a different one of the output taps along the delay line 14. For the purposes of the example set forth above with respect to Fig. 1, cathode follower stage 16 is connected to a tap giving a 2 microsecond delay while stage 17 is connected to the end of delay line 14 giving a delay of 6 microseconds.

The output of cathode follower stage 17 is connected to the input of multivibrator 30 the output of which in turn is connected to the input of multivibrator 31. The output of multivibrator 31 is connected to the input of multivibrator 32. For purposes of the example above set forth with respect to Fig. 1, multivibrator circuit 30 is astable having a natural period somewhat longer than the predicted interval required for three groups of pulses to occur. Multivibrator circuits 31 and 32 are circuits having a single stable state. Multivibrator 30 is tripped from its untriggered state herein called condition 1 to the triggered state, herein called condition 2, upon reception of a pulse from cathode follower 17. Multivibrator 31 is tripped into its unstable state by the return of multivibrator 30 to condition 1. Multivibrator 32 is tripped into its unstable state by the return of multivibrator 31 to its stable state. The outputs of multivibrators 30, 31 and 32 are so connected as to give a positive gating pulse at their respective outputs 46, 47 and 48 when multivibrator 30 is in condition 2 and when multivibrators 31 and 32 are in their unstable states.

The output of multivibrator 30 is connected to the input of shaper circuit 33. This circuit is an integrating circuit so connected as to round off the leading substantially vertical positive-going edge of the pulse produced by multivibrator 30. Shaper circuit 33 may consist of a series resistor and a condenser connected from the output side of the resistor to ground. Circuit 33 could be any circuit which would delay the time when the gating pulse from multivibrator 30 becomes sufficiently positive to enable coincidence circuit 35.

The outputs of trigger cathode follower stage 17 and of shaper 33 are connected to coincidence circuit 35. Coincidence circuit 35 is such a circuit that it will produce no output unless there are simultaneously applied to its inputs a positive gating or enabling pulse from shaper 33 and a positive pulse from cathode follower stage 17. Coincidence circuit 35 may consist of a pentode, the control grid of which is connected to the cathode of trigger cathode follower 17 and the suppressor grid of which is connected to the output of shaper 33. A switch 37 may be provided to stop the operation of coincidence circuit 35. Switch 37 may disconnect ground potential from one end of resistor 36 acting as part of a potential divider supplying normal operating bias and leaving a disabling negative potential on the control grid of the pentode in coincidence circuit 35.

There are also provided coincidence circuits 39 and 43 which perform the same function and may have the same circuit as was described above for coincidence circuit 35. The inputs of coincidence circuit 39 are connected to trigger circuit 15 and to multivibrator 31. The inputs of coincidence circuit 43 are connected to trigger cathode follower 16 and to multivibrator 32. The input from trigger cathode follower 15 to coincidence circuit 39 is connected to ground through resistor 40 and switch 41 which is normally closed. The input to coincidence circuit 43 from trigger cathode follower 16 is connected to ground through resistor 44 and switch 45 which is normally closed.

The outputs of coincidence circuits 35, 39 and 43 are connected together and to the input of blocking oscillator 49, the output of which is connected to the input of sweep circuit 50. The output of sweep circuit 50 is connected to one of the horizontal plates 27 of cathode ray tube 26.

In the opeartion of the device shown in Fig. 1, for use with a three-pulse group coded as set forth above, the connection of cathode follower 16 to the delay line 14 is such as to provide a 2 microsecond delay and the input of cathode follower 17 is at the end of delay line 14 to provide a 6 microsecond delay. Assume a starting time $t=0$ where multivibrator 30 is in condition 1 just prior to being triggered to condition 2. The first group of pulses 51 of plot A in Fig. 2 is applied through cathode follower circuit 15 to one input of coincidence circuit 39. However, coincidence circuit 39 gives no output since multivibrator 31 is in its stable state and applying a sufficiently negative voltage to the coincidence circuit to prevent operation of the latter. When the group of pulses 51 arrives at cathode follower circuit 16, they are applied to coincidence circuit 43 which gives no output since multivibrator 32 is in its stable state. When the group of pulses 51 arrives at the end of delay line 14, they are applied to cathode follower 17. The first pulse in group 51 as applied through cathode follower 17 trips multivibrator 30 causing it to switch to condition 2 which impresses on shaper circuit 33 a steeply fronted positive gating pulse 55 as is shown at D in Fig. 2. Shaper circuit 33 at its output provides the positive gating pulse 56 in plot E of Fig. 2 coincident in time with the positive pulse 55 of plot D but having rounded leading and trailing edges. This delays to some extent the enabling of coincidence circuit 35 and prevents any of the three pulses of the first group from causing an output from the coincidence circuit 35.

Because of its time constant, the multivibrator 30 remains in its condition 2 as is shown in plot D in Fig. 2 until after the second group of pulses 52 arrives. Since only coincidence circuit 35 is enabled by the positive gating pulse 56 of plot E, the second group of pulses 52 fails to produce an output in coincidence circuits 39 or 43. However, the first pulse of the second group of pulses 52′, delayed by 6 microseconds, as shown in plot B of Fig. 2 is applied through cathode follower 17 to one input of coincidence circuit 35 which produces an output pulse and applies it to the input of blocking oscillator 49.

Upon the reception of a triggering pulse from coincidence circuit 35, blocking oscillator 49 produces a short positive pulse. The insensitive time of the blocking oscillator following the pulse is, however, at least the 6 microseconds which might be occupied by the group of three coded pulses. This prevents blocking oscillator 49 from being tripped by each pulse of a group. The output of blocking oscillator 49 is applied to the input of sweep circuit 50 which then produces a linear sawtooth sweep wave to provide a time base for the cathode ray tube 26. Since this sweep wave was initiated by the first pulse of a group, delayed so as to occupy the position which the third pulse of a group should occupy, a horizontal trace with a vertical deflection should appear on screen 29, caused by an application of the third pulse of substantially undelayed group 52 from signal cathode follower 13 to the vertical plates 25. Cathode followers 11 and 13 are isolating stages. Delay circuit 12 interposes a delay of about .05 microsecond to compensate for the delays inherent in the circuit providing the time base. The third pulse should appear near the beginning of the sweep as seen at 71 in Fig. 3.

After a predetermined period which is about 1½ times the period of the recurring groups, multivibrator 30 reverts back to its condition 1 at a time indicated by the trailing edge 57 of pulse 55 in plot D. This trips multivibrator 31 causing it to enter its unstable state and provide the positive gating pulse 58 of plot F in Fig. 2. The positive gating pulse 58 is applied to coincidence circuit 39 and allows the first pulse of the third group 53 of plot A, undelayed to pass through the coincidence circuit and be applied to the blocking oscillator 49, to cause a sweep to be generated in coincidence with the occurrence of the first pulse. This sweep displays the first, second and third pulses, pips 72, 73 and 74, respectively, in Fig. 4 of the third substantially undelayed group 53, in their correct order and relative positions with the first pulse 72, if the timing is correct, being at the same point on screen 29 of cathode ray tube 26 as was occupied by the third pulse 71 in Fig. 3.

Figure 5:
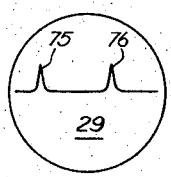

After a predetermined interval which is about equal to the time interval between groups, multivibrator 31 reverts to its stable state at a time indicated by the trailing edge 59 of pulse 58. This triggers multivibrator 32 causing it to enter its unstable state and provide a positive gating pulse 60 for the coincidence circuit 43. The first pulse of the fourth group 54″ (as seen in plot C of Fig. 2), delayed by 2 microseconds to occupy the position which should be occupied by the second pulse of a group, is thus allowed to pass through coincidence circuit 43 and operate the sweep circuit 50 through blocking oscillator 49. If the second pulse of the fourth substantially undelayed group 54 (passing through components 11, 12 and 13) is in its correct position, it should be shown as pip 75 at the beginning of the trace of the cathode ray tube 26 as seen in Fig. 5. The third pulse would also be shown as pip 76.

After a predetermined time interval which is about equal to the interval between groups, multivibrator 32 reverts to its stable state at a time indicated by trailing edge 61 of pulse 60. The above described cycle starts again prior to the reversion of multivibrator 32 beginning with the tripping of multivibrator 30 by the group following group 54.

Figure 3:
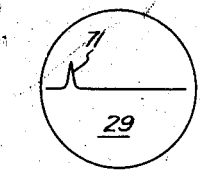
Figure 4:
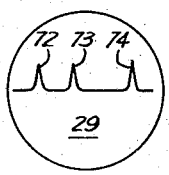

Since there is some persistence to the screen 29 of cathode ray tube 26, the first pulse of each trace as seen in Figs. 3, 4 and 5 will appear superimposed. Each sweep, as accurately positioned by delay line 14, begins where the successively shown third, first and second pulses should be. If the relative spacing of the pulses varies from group to group, the pulses successively displayed as shown in Figs. 3, 4 and 5, will appear to not be stationary but to rapidly shift in position or "jitter." If the spacing is uniform from group to group but the spacing is not in accord with the assigned positions as set in delay line 14, the pulses 71, 72 and 75 shown in Figs. 3, 4 and 5 will remain in one position but will not be properly aligned with respect to each other.

Such misalignment may be studied more closely and with higher precision by shortening the sweep period so that one sweep across the cathode ray tube screen 29 has a duration only a little longer than one pulse of the group. This spreads out the pulses horizontally as shown in Fig. 6. For even greater precision the sweep may be even more shortened to show the alignment of the leading edges of the superimposed pulses as seen in Fig. 7. In Figs. 6 and 7 the beginning of the sweep may be centered by the application of a direct potential to one of the horizontal deflecting plates. The vertical height of the pulses may also be increased as seen in Fig. 7.

Switches 37, 41 and 45 are provided to selectively suppress the third, first or second pulses, respectively. In this way the identity of the misaligned pulse or pulses can be determined. For example, if switch 37 is opened and the left hand leading edge of Fig. 7 disappears, it is then known that the third pulse is early with respect to the other two, and in addition, the position of the third pulse leading edge with respect to the first pulse leading edge on the screen shows the accuracy of the position of the third pulse in the code.

Fig. 8 shows an alternative embodiment of this invention in which a series of bistable multivibrators are used to produce the gate pulses. In Fig. 8 components 10, 11, 12, 13, 14, 26, 49 and 50 are the same in construction and operation as the corresponding parts in Fig. 1.

In Fig. 8 the source of coded pulses 10 is connected to the input of a delay circuit 85 which on being triggered by the pulse group, provides a single pulse delayed somewhat longer than the maximum time spread of a code group. For the purpose of this example it may be delayed by approximately half the interval between groups. The output of delay circuit 85 is applied to the input of bistable multivibrator 86. The application of the delayed pulse from component 85 causes multivibrator 86 to shift from one stable state to the other. An output of multivibrator 86 is applied to the input of bistable multivibrator 87. Multivibrator 87 is so connected that each time multivibrator 86 completes a cycle, multivibrator 87 shifts from one stable state to another. Multivibrators 86 and 87 each produce a push-pull square wave. The period of the square wave produced by multivibrator 87 is double that produced by multivibrator 86.

The push-pull outputs of multivibrators 86 and 87 are applied to combining circuit 88 which adds each of the outputs of multivibrator 86 to each of the outputs of multivibrator 87 to produce four outputs, each containing gating pulses having a duration including the occurrence of a different one of a successive group of pulses.

Coincidence circuits 89, 92, 95 and 98 are provided which are the same in structure and operation as coincidence circuits 35, 39 and 43 in Fig. 1. Coincidence circuits 89, 92, 95 and 98 are provided with resistor-switch circuits 90—91, 93—94, 96—97, and 99—100, which are the same in structure and operation as the components 36—37, 40—41, and 44—45 in Fig. 1. Each of the four outputs of combining circuit 88 are applied to one input of a different one of coincidence circuits 89, 92, 95 and 98.

Trigger cathode follower circuits 80, 81, 82 and 83 are provided which are the same in structure and operation as components 15, 16 and 17 in Fig. 1. The input of component 80 is connected to the source of coded pulses 10. The inputs of components 81, 82 and 83 are respectively connected to selected points along delay line 14 representative of the interval separating each subsequent pulse in a group from the first pulse. The outputs of components 80, 81, 82, and 83, are respectively applied through condensers to the other of the inputs of coincidence circuits 89, 92, 95 and 98. The outputs of coincidence circuits 89, 92, 95 and 98 are combined and connected to the input of blocking oscillator 49.

In the operation of the system shown in Fig. 8, the groups of pulses from the source 10, as seen in plot H of Fig. 9, are coupled to delay circuit 85 which operates to produce a single delayed pulse in response to each of the groups of pulses. Each pulse produced by delay circuit 85 is delayed with respect to the first pulse of its initiating group by a time which is longer than the time interval during which all pulses of a group occur, as shown in plot I of Fig. 9. Each pulse shown in plot I causes multivibrator 86 to shift from one state to the other producing the output waves in plots J and K. Multivibrator 87 is tripped from one state to another each time multivibrator 86 completes a cycle to produce the output waves seen in plots L and M.

The addition of the waves seen in plots J and L, K and L, J and M, and K and M produces the gating waves shown in the correspondingly captioned plots in Fig. 9.

These gating waves are applied respectively to coincidence circuits 89, 92, 95 and 98, which are biased so as to be enabled only when the gating wave extends above the bias represented by the dotted lines in plots J+L through K+M. It will thus be seen that coincidence circuits 89, 92, 95 and 98 will be successively enabled by pulses 101, 102, 103 and 104 which extend above their corresponding dotted lines. Concurrently with coincidence circuit 89 becoming enabled by pulse 101, the undelayed second group of pulses from cathode follower circuit 80 is coupled to the other input of coincidence circuit 89 and is passed thereby. The first pulse of this group triggers blocking oscillator 49, which in turn triggers sweep circuit 50, thus initiating a horizontal sweep in cathode ray tube 26. Simultaneously with the initiation of this horizontal sweep the second group of pulses is coupled from source 10 to the vertical deflection plate 25 of cathode ray tube 26. This will permit the entire second group of pulses from source 10 to be displayed on the screen 29 of cathode ray tube 26. As explained previously, in relation to Figs. 6 and 7, the horizontal sweep of the cathode ray tube may be shortened so that only the first pulse of a displayed group, or only the leading edge of the first pulse may be displayed on screen 29.

In a similar manner the third group of pulses of waveform Fig. 9H is delayed in delay line 14 by a time substantially equal to the time interval between the first pulse and the second pulse of a correctly coded group, and is coupled from cathode follower 81 to coincidence circuit 92 during the occurrence of the positive portion of gating pulse 102 which is also coupled to coincidence circuit 92. Coincidence circuit 92 operates in response to positive pulse 102 and the simultaneously occurring delayed third group of pulses to pass said delayed group to blocking oscillator 49. The first pulse of this group triggers blocking oscillator 49 which in turn triggers sweep circuit 50, thereby initiating a horizontal sweep in cathode ray tube 26. It is therefore evident that the start of this sweep is delayed with respect to the first pulse of an undelayed third group by a time equal to the time interval between the first pulse and the second pulse of a correctly coded group, and will therefore permit the display on screen 29 of the second pulse of the relatively undelayed third group of pulses coupled from source 10 to vertical deflection plate 25 of cathode ray tube 26.

In a similar manner the fourth group of pulses from source 10, Fig. 9H, is delayed in delayed line 14 by a time which is substantially equal to the time interval between the first and third pulses of a correctly coded group, and is coupled from cathode follower 82 to one input of coincidence circuit 95 during the occurrence of the positive portion of gating pulse 103 which is coupled to the other input of coincidence circuit 92. The monitoring circuit then operates as previously described to display during the initial part of a newly generated horizontal sweep the third pulse of the undelayed fourth group of pulses coupled from source 10 to vertical deflection plate 25 of cathode ray tube 26.

A similar sequence of operation is followed when the fifth group of pulses, Fig. 9H, is delayed in delay line 14 by a time substantially equal to the time interval between the first and fourth pulses of a correctly coded group, is coupled to coincidence circuit 98 simultaneously with gating pulse 104, and causes, in the manner described above, a horizontal sweep in cathode ray tube 26. This sweep is initiated at a time to display, during the initial portion thereof, the fourth pulse of a group of pulses from source 10 coupled to vertical deflection plate 25 of cathode ray tube 26. The resulting display on the screen of cathode ray tube 26 and the use of the display is as set forth with respect to Fig. 1.

It will be seen that the above-described systems provide a simple means for determining the accuracy of position of a group of coded pulses.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a monitoring system for observing the positional accuracy of the pulses in a recurring group of coded pulses, the combination comprising means coupled to a source supplying a recurrent group of coded pulses for providing an undelayed succession of groups of said coded pulses, delay means coupled to said source for producing a plurality of successions of delayed groups of said pulses to be monitored, each of said delayed successions having a different predetermined time relation to said undelayed succession of groups, said time relations corresponding, respectively, to the time intervals between the first pulse and succeeding pulses in a correctly coded group, a plurality of coincidence means each one being coupled, respectively, to receive the pulses from a different one of said successions of groups, gating means coupled to receive one of said successions of groups of pulses and operating in response thereto to produce a recurring series of successively occurring gating pulses, the number of gating pulses in said series being equal to the number of coincidence means, means connecting said gating means to each one of said coincidence means for coupling each gating pulse of a series to a respective one of said coincidence means, each respective gating pulse having a time duration which includes the time of occurrence of a group of pulses which is simultaneously applied to the corresponding coincidence circuit, the respective groups which are included in the time durations of said gating pulses being different groups from different successions and being groups which correspond to successive groups of an undelayed succession, means connected to all of said coincidence means for generating a recurrent time base in response to the coincidence of each one of said gating pulses and the first pulse of a simultaneously occurring group from a corresponding succession, and display means coupled to said time base generating means and coupled to said source for displaying at least portions of groups of pulses from said source which occur during the occurrences of said time base.

2. In combination, an input terminal connected to a source supplying a recurrent group of coded pulses, a plurality of conducting paths each having a different electrical length and each being coupled to said input terminal, one of said paths providing substantially no delay to electrical signals passing therealong and the remaining paths providing respective delays which are equal to the time intervals between the first pulse and successive pulses of a correctly coded group, a plurality of series connected multivibrator circuits equal in number to the number of said paths, a first of said multivibrators being connected to the path providing the longest delay and the remainder of said multivibrators being arranged so that the return of a preceding multivibrator to its stable state causes the next serially connected multivibrator to go into its unstable state, a plurality of coincidence circuits equal in number to the number of said paths, a first input terminal of each of said coincidence circuits being coupled respectively, to one of said paths, a second input terminal of each one of said coincidence circuits being coupled to a respective multivibrator circuit, whereby said multivibrators provide successively occurring gating pulses in sequence to said coincidence circuits, each successive gating pulse having a time duration which includes the time of occurrence of one group of pulses which is simultaneously applied to the corresponding coincidence circuit, the groups of pulses which are coupled to the coincidence circuits simultaneously with the corresponding gating pulses being successively occurring groups from different paths and being groups which correspond to successively occurring undelayed groups, sweep generating means coupled to receive the output signals of each of said coincidence circuits and adapted to initiate a sweep voltage upon the occurrence of the first pulse of each group of pulses passed by said coincidence circuits, said sweep voltages having a duration greater than the time interval of one of said groups, and display means having first and second deflection means, one of said deflection means being coupled to said sweep generating means and the other deflection means being coupled to said source.

3. In a pulse monitoring system, first, second and third input means coupled to a common source of signals, said signals being in the form of a recurrent group of coded pulses, means for delaying signals received by said second input means with respect to signals received by said first input means, and means for delaying signals received by said third input means with respect to signals received by said second input means, the delays of the signals received by said second and third input means corresponding respectively to the time differences between the occurrence of the first pulse and two successively occurring pulses of a correctly coded group, a plurality of coincidence means each having two input terminals and an output terminal, each of said coincidence circuits being coupled to receive the signals from a different one of said input means, first, second and third multivibrator circuits connected in series, the first multivibrator circuit being coupled to receive signals from said third input means, said multivibrator circuits being arranged so that the first multivibrator circuit is tripped into an unstable state by signals from said third input means and so that the second and third multivibrator circuits are tripped into unstable states by the return of the preceding multivibrator circuit to its stable state, said multivibrator circuits being coupled, respectively, to said coincidence circuits, each of said multivibrator circuits when in its unstable state providing a pulse of the correct polarity and magnitude to enable the respective coincidence circuit coupled thereto, whereby said multivibrator circuits supply successive gating pulses in sequence to said coincidence circuits, each gating pulse applied to its respective coincidence circuit having a time duration which includes the time of occurrence of one group of pulses which is simultaneously applied to the same respective coincidence circuit, the respective groups of pulses which occur during one sequence of successively occurring gating pulses being from different input terminals and corresponding to successively occurring undelayed groups, and a time base sweep generator coupled to the output terminal of each of said coincidence circuits.

4. The monitoring circuit of claim 3 in which there are means connected between said first multivibrator circuit and the first one of said coincidence circuits to delay the application of the output of the first multivibrator circuit to said other input terminal of said first coincidence circuit.

5. The monitor of claim 3 in which there is provided an isolating stage between each of said first, second and third inputs and said one input of each of said first, second and third coincidence circuits.

6. The monitor of claim 3 in which there is provided a cathode ray tube having two deflecting means, and in which said common source is connected to one of said deflecting means and in which the output of said sweep generator is connected to the other of said deflecting means.

7. The combination of claim 6 in which a delay means is connected between said common signal source and said one deflecting means of said cathode tube.

8. In a monitoring system for observing the positional accuracy of the pulses in a recurrent group of coded pulses, the combination including, means coupled to a source supplying coded pulses to be monitored for producing a plurality of successions of groups of said pulses, one of said successions being an undelayed succession and each of the remainder of said successions having a different predetermined time delay wtih respect to said undelayed succession, said time delays corresponding, respectively, to the time intervals between the first pulse and successive pulses of a correctly coded group, a plurality of coincidence circuits each coupled to receive the pulses from a different one of said successions of groups, a plurality of multivibrator circuits having output terminals respectively coupled to said coincidence circuits, a first of said multivibrator circuits being coupled to receive the succession of groups having the longest delay and being adapted to produce in response to the first pulse of a given group a gating pulse whose time duration includes the time of occurrence of the next succeeding group of pulses from the same succession of groups, the remainder of said multivibrator circuits being serially connected to said first multivibrator and being arranged to be tripped into an unstable state by the return of the preceding multivibrator to its stable state, whereby said multivibrators provide successively occurring gating pulses in sequence to the respective coincidence circuits, each of said gating pulses having a time duration which includes the time of occurrence of one group of pulses which is simultaneously applied to the corresponding coincidence circuit, means coupled to all of said coincidence means for generating a recurring time base in response to the output of each of said coincidence means, and display means coupled to receive groups of pulses from said source and coupled to said time base means for displaying at least portions of groups of pulses from said source which occur simultaneously with the occurrences of said time base.

9. The combination of claim 8 in which there is provided a delay means between the output of said first multivibrator and the coincidence circuit to which said first multivibrator is connected.

10. The combination of claim 8 in which a delay means is provided between said source and said display means.

11. The combination of claim 8 in which a blocking oscillator is provided between the outputs of said coincidence circuits and the input of said time base generating means.

12. In a monitoring system for observing the time of occurrence of pulses in a recurring group of coded pulses, the combination comprising, means coupled to a source supplying a recurrent group of coded pulses for providing an undelayed succession of groups of said pulses, delay means coupled to said source and responsive to the pulses to be observed for providing a plurality of delayed successions of groups of said pulses, each of said delayed successions having a different predetermined time relationship to said undelayed succession of pulses, said time relations corresponding, respectively, to the time intervals between the first pulse and each succeeding pulse in a correctly coded group of pulses, a plurality of coincidence means each one being coupled to receive pulses from a different one of the successions of groups of pulses, gating means responsive to one of said delayed successions for supplying successively occurring gates in sequence to said coincidence means, each of the gates coupled to the respective coincidence means having a time duration which includes the time of occurrence of a predetermined group of pulses from the corresponding succession of groups which is coupled to the same coincidence circuit, the groups from the different successions which occur simultaneously with the corresponding gates being groups which correspond to successive groups from an undelayed succession, whereby a different group of pulses from a different succession occurs simultaneously with the occurrence of each of said gates, means connected to all of said coincidence means for generating a recurrent time base in response to the coincidence of each one of said gates and the first pulse of a simultaneously occurring group from a corresponding succession, and display means coupled to said time base generating means and coupled to receive a succession of groups of pulses from said source for displaying at least portions of groups of pulses from said source which occur during the occurrences of said time base.

13. The combination as claimed in claim 1 wherein said gating means is coupled to receive an undelayed succession of groups of pulses and includes means for providing a single delayed pulse in response to each group of pulses in said undelayed succession, each of said delayed single pulses being delayed with respect to the first pulse of its initiating group by a time which is longer than the time interval during which all pulses of a group occur.

14. The combination as claimed in claim 13 wherein said gating means further includes a plurality of serially connected bistable multivibrators with the first one of said multivibrators being coupled to said means producing a single delayed pulse in response to each group, said first multivibrator being arranged to shift from one stable state to another upon the application thereto of each of said single delayed pulses, each subsequent multivibrator being arranged to shift from one stable state to the other upon the completion of a cycle by the preceding multivibrator, each multivibrator producing an output consisting of two push-pull square waves, and combining means for combining said push-pull outputs to provide said series of gating pulses.

References Cited in the file of this patent

UNITED STATES PATENTS

| | | |
|---|---|---|
| 2,355,363 | Christaldi | Aug. 8, 1944 |
| 2,403,429 | Anderson | July 9, 1946 |
| 2,430,570 | Hulst, Jr. | Nov. 11, 1947 |
| 2,609,533 | Jacobsen | Sept. 2, 1952 |
| 2,689,346 | Pierce et al. | Sept. 14, 1954 |

FOREIGN PATENTS

| | | |
|---|---|---|
| 552,072 | Great Britain | Mar. 22, 1943 |
| 585,909 | Great Britain | Feb. 28, 1947 |